No. 692,272. Patented Feb. 4, 1902.
G. GRAZIER.
COMBINED SPIKE PULLER AND CAR MOVER.
(Application filed July 17, 1901.)
(No Model.)
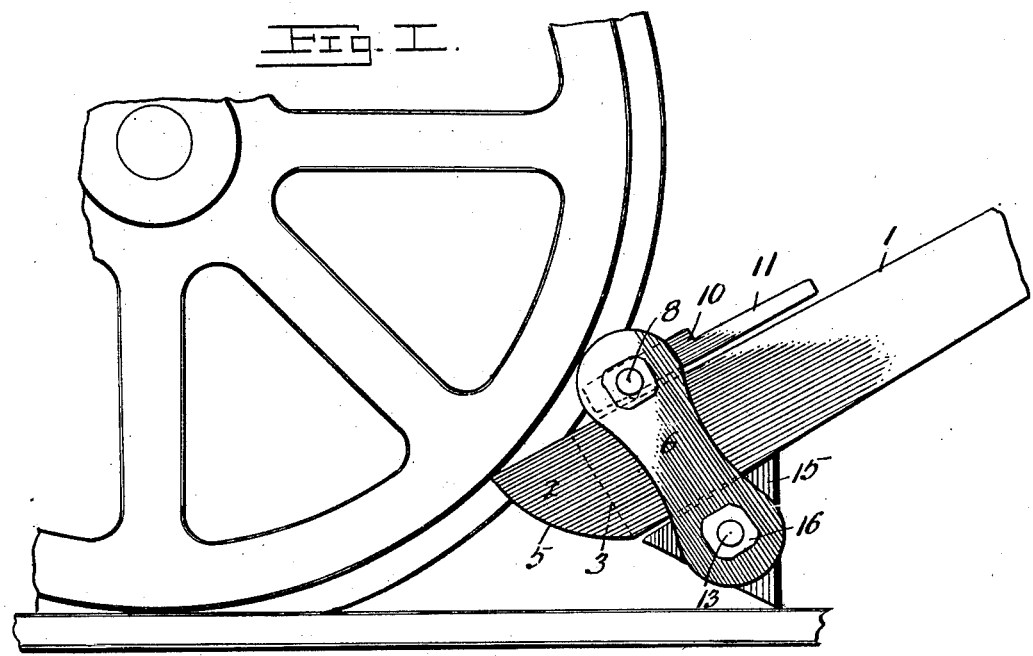
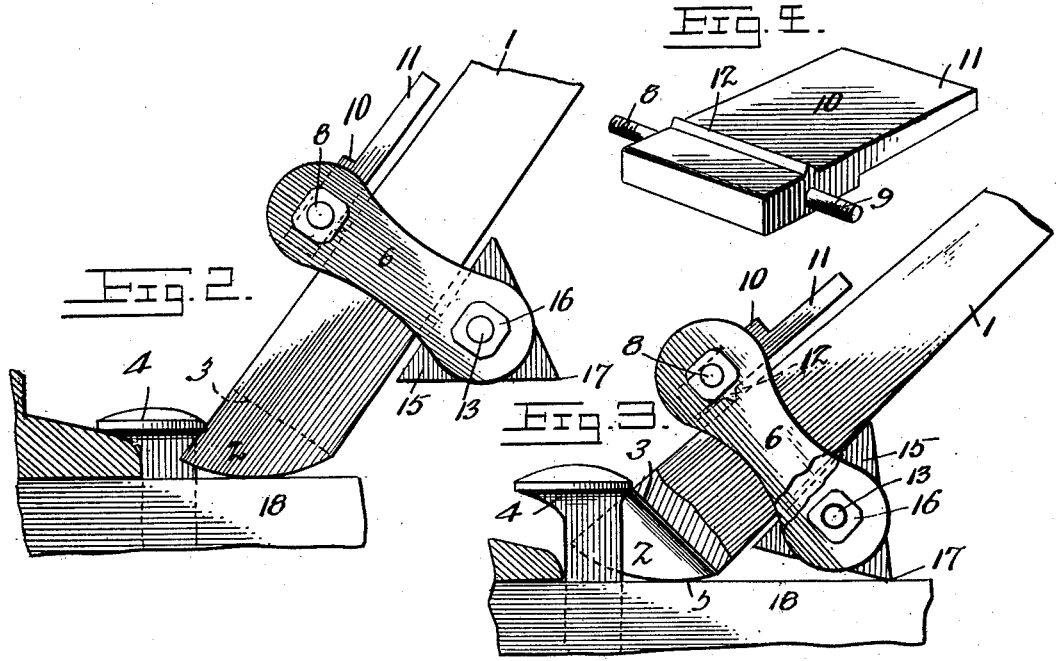
Witnesses
F. E. Alden.
C. N. Woodward.
G. Grazier, Inventor
by C. A. Snow & Co
Attorneys

UNITED STATES PATENT OFFICE.

GIDEON GRAZIER, OF TYRONE, PENNSYLVANIA.

COMBINED SPIKE-PULLER AND CAR-MOVER.

SPECIFICATION forming part of Letters Patent No. 692,272, dated February 4, 1902.

Application filed July 17, 1901. Serial No. 68,658. (No model.)

*To all whom it may concern:*

Be it known that I, GIDEON GRAZIER, a citizen of the United States, residing at Tyrone, in the county of Blair and State of Pennsylvania, have invented a new and useful Combined Spike-Puller and Car-Mover, of which the following is a specification.

This invention relates to devices used in railway construction and operations, and has for its object the production of an implement capable of being employed as a spike-puller and also as a car-mover; and it consists in the construction, combination, and arrangement of parts, as hereinafter shown and described, and specifically pointed out in the claims.

In the drawings, Figure 1 is a side view of the implement, illustrating its operation when employed as a car-mover. Fig. 2 is a view illustrating the operation when employed as a spike-puller at the first stage of its operation. Fig. 3 is a similar view illustrating the operation at the second stage of the operation. Fig. 4 is a reversed perspective view of the tongue-plate detached.

The implement consists of a bar 1, of any suitable length, having "claws" 2 at its lower or operative end, with a recess 3 between the claws, and forming the means of engagement with the spike 4 in the usual manner of a spike-pulling implement, the end of the bar being curved backward, as at 5, to form the fulcrum of the lever action of the bar and the extremities of the claws being knife-edged, as shown. On each side of the bar is a link 6, pivoted at their upper ends on projecting studs 8 9 on a plate 10, the plate having a rearwardly-extending tongue 11 and a transverse knife-edged rib 12 next the bar 1. The lower ends of the links 6 are connected beneath the bar 1 by the studs 13, projecting from the ends of a triangular block 15, one of the flat sides of the block coming next the bar 1, as shown. The block 15 and the plate 10 do not engage the bar closely, so that the links and their connected plate 10 and block 15 are free to slide along the bar, as shown in Fig. 1. The studs 8, 9, and 13 are provided with nuts 16 on their outer ends, by which the links are held in place, while at the same time the plate and block are free to turn between the links.

When used as a spike-puller, the links and the connected plate and block are moved upward on the bar 1, so that at the first action of the bar upon the spike, as in Fig. 1, the block 15 will be inoperative. The spike will thus be "started" upward for a short distance or as far as the short fulcrum 5 will permit. The outer end of the bar 1 is then elevated and the block 15 permitted to run down until the edge 17 rests upon the tie 18, which action provides a new and longer fulcrum, which will permit the spike to be pulled entirely out of the tie without bending.

By this simple means an implement is provided having two independent fulcrums of different "nips," one stationary and one movable, which enables the implement to be employed to much greater advantage and for an increased number of purposes. For instance, by allowing the movable fulcrum to run down to a point near the claws of the implement a most efficient car-mover is provided, as shown in Fig. 1, which will be found very useful about warehouses and elevators, where cars are frequently required to be moved for short distances when locomotives are not available.

The knife-edged rib 12 performs an important function, as it forms a "grip" upon the bar and assists in preventing the movable fulcrum from slipping when the implement is in action.

The upper side of the block 15 affords an extended bearing-surface and relieves the studs and the links from a very large share of the strain. When one of the "edges" of the block 15 becomes "dull," a new edge may be brought into action by removing the movable fulcrum, turning the block one-third of a revolution upon its studs 13 and 14, and replacing upon the bar. Thus the life of the implement can be materially extended.

The wearing parts of the implement will preferably be of tempered steel, so that they will the better withstand the severe strains to which they will be subjected. The tongue 11 serves to assist in moving the fulcrum along the bar and is a very convenient and useful feature.

What I claim as new is—

1. In a device of the class specified, a bar having a claw at one end, and a block slidably disposed with relation to said bar, said block being of triangular form in cross-section and having a plurality of sharp edges any one of which may be adjusted to form the fulcrum-point of the bar.

2. In a device of the class specified, a claw-bar and an adjustable fulcrum slidably disposed with relation to said bar, said fulcrum being in the form of a triangular block, adjustable with respect to the bar and having a plurality of sharp edges, any one of which may be arranged to form the fulcrum-point of the bar.

3. In a device of the class specified, a claw-bar, a block having a series of sharp edges and disposed below said bar, a plate having a transverse knife-edged rib and disposed above said bar, and links engaging said block and plate slidably with said bar.

4. In a device of the class specified, a claw-bar, a triangular block having a plurality of sharp edges, any one of which may be adjusted to form the fulcrum-point, studs projecting from the central portion of the ends of said block, a plate adapted to engage with the upper side of the bar, studs projecting from the opposite sides of said plate, and links arranged one on each side of the bar and connecting the studs of the plate and block, substantially as described.

In testimony that I claim the foregoing as my own I have hereto affixed my signature in the presence of two witnesses.

GIDEON GRAZIER.

Witnesses:
C. O. TEMPLETON,
W. L. HICKS.